United States Patent
Wang et al.

(10) Patent No.: US 10,450,861 B2
(45) Date of Patent: Oct. 22, 2019

(54) SYSTEMS AND METHODS FOR DETERMINING DIELECTRIC CONSTANT OR RESISTIVITY FROM ELECTROMAGNETIC PROPAGATION MEASUREMENT USING CONTRACTION MAPPING

(71) Applicant: Schlumberger Technology Corporation, Sugar Land, TX (US)

(72) Inventors: Gong Li Wang, Sugar Land, TX (US); Tianxia Zhao, Stafford, TX (US); Keli Sun, Sugar Land, TX (US); Aria Abubakar, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 912 days.

(21) Appl. No.: 14/957,531

(22) Filed: Dec. 2, 2015

(65) Prior Publication Data

US 2016/0170069 A1 Jun. 16, 2016

Related U.S. Application Data

(60) Provisional application No. 62/092,316, filed on Dec. 16, 2014.

(51) Int. Cl.
*E21B 49/00* (2006.01)
*G01V 3/28* (2006.01)
*G01V 3/38* (2006.01)

(52) U.S. Cl.
CPC ............ *E21B 49/00* (2013.01); *G01V 3/28* (2013.01); *G01V 3/38* (2013.01)

(58) Field of Classification Search
CPC ............ E21B 49/00; G01V 3/28; G01V 3/38
(Continued)

(56) References Cited

U.S. PATENT DOCUMENTS 4,107,598 A 8/1978 Meador et al.
4,968,940 A * 11/1990 Clark ................. G01V 3/30
324/338

(Continued)

FOREIGN PATENT DOCUMENTS

WO 2009083114 A2 7/2009

OTHER PUBLICATIONS

Soufiani, Analysis of Communication System Using Iterative Method Based on Banach's Contraction Principle, 2007.*
(Continued)

*Primary Examiner* — Michael P Nghiem
*Assistant Examiner* — Dacthang P Ngo

(57) ABSTRACT

Identifying the dielectric constant and/or the electrical resistivity of part of a geological formation may reveal useful characteristics of the geological formation. This disclosure provides methods, systems, and machine-readable media to determine dielectric constant or electrical resistivity, or both, using contraction mapping. Specifically, contraction mapping may be used with a function of wavenumber k to iteratively solve for values of dielectric constant and electrical resistivity until convergence is achieved. This may allow for convergence to a solution without computing partial derivatives and/or with fewer iterations than previous techniques.

20 Claims, 6 Drawing Sheets

(58) Field of Classification Search
USPC .............................................................. 702/7
See application file for complete search history.

(56) References Cited

U.S. PATENT DOCUMENTS

| | | |
|---|---|---|
| 5,811,973 A | 9/1998 | Meyer, Jr. |
| 2003/0163258 A1 | 8/2003 | Haugland |
| 2007/0061082 A1 | 3/2007 | Seleznev et al. |
| 2012/0025834 A1* | 2/2012 | Minerbo .................. G01V 3/28 |
| | | 324/339 |
| 2013/0176030 A1 | 7/2013 | Simon |

OTHER PUBLICATIONS

International Search Report issued in related PCT application PCT/US2015/063618 dated Feb. 23, 2016, 4 pages.

International Preliminary Report on Patentability issued in International Patent application PCT/US2015/063618, dated Jun. 20, 2017, 8 pages.

* cited by examiner

ITERATIONS TO CONVERGENCE FOR DIFFERENT $e_r$ AND $R_t$ WHEN
$f$ = 2MHz, SPACING = 16", AND INITIAL GUESS = 0.001
FOR BOTH DIELECTRIC AND RESISTIVITY (EQ.3)

SYSTEMS AND METHODS FOR DETERMINING DIELECTRIC CONSTANT OR RESISTIVITY FROM ELECTROMAGNETIC PROPAGATION MEASUREMENT USING CONTRACTION MAPPING

CROSS-REFERENCE TO RELATED APPLICATIONS

The present disclosure claims priority to U.S. Provisional Application Ser. No. 62/092,316 filed Dec. 16, 2014, the entirety of which is incorporated by reference.

FIELD OF THE INVENTION

Aspects relate to downhole drilling apparatus. More specifically, aspects relate to systems and methods to determine a dielectric constant or resistivity from electromagnetic propagation measurements.

BACKGROUND

This disclosure relates to using contraction mapping to efficiently determine a dielectric constant and/or an electrical resistivity of a geological formation.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Identifying the composition of a geological formation can provide information about the likely presence or absence of hydrocarbons in a subsurface geological formation. As such, many downhole tools have been developed that aim to analyze the geological formation from within a wellbore. Electromagnetic logging tools are one type of downhole tool that may be used to measure properties of the geological formation. By measuring the way that propagation radio waves travel through the geological formation, the composition of the geological formation may be ascertained at various depths through the well. Indeed, the attenuation and phase shift of the propagation radio waves through the geological formation are dependent on electromagnetic properties of the materials that compose the geological formation—namely, electrical resistivity and dielectric constant, among others. These electromagnetic values may correspond to the composition of the geological formation.

In many cases, the dielectric constant of the geological formation may be determined due to a relationship to the resistivity of the geological formation, using an empirical formula based on measurements of a large number of rock samples, mainly sandstone and carbonate. For shale formations, however, the relationship is not so straightforward. Instead, dielectric inversion may be used to obtain the formation resistivity and dielectric constant independently in shale. This inversion may involve an iterative minimization procedure to minimize a discrepancy between the measured electromagnetic data and simulated data for models related to particular formation compositions with a forward modeling program or with a two-dimensional lookup table. In this way, through multiple iterations, values of electrical resistivity and dielectric constant may sometimes be found.

But the approach noted above is not without its drawbacks. Indeed, the iterative minimization procedure to determine electrical resistivity and dielectric constant may sometimes fail to converge—that is, to sufficiently minimize the discrepancies between the measured and simulated electromagnetic data—thereby producing no solution values or producing values that may not be reliable. The approach may also be heavily dependent on the initial guess of the proper values of electrical resistivity and dielectric constant, meaning that the ability to converge to a solution or the number of iterations to converge to the solution may vary depending on the initial guess of these values.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure relate to methods, systems, and machine-readable media to determine dielectric constant or electrical resistivity, or both, using contraction mapping. In one example, a method includes placing a downhole tool in a wellbore in a geological formation and using the downhole tool to obtain an electromagnetic attenuation measurement and an electromagnetic phase shift measurement. With a processor, dielectric constant or resistivity, or both, may be solved for via contraction mapping, in which wavenumber is solved for iteratively using a function of wavenumber having attenuation and phase shift as a complex constant.

In another example, a system includes a transmitter, a near receiver, a far receiver that is farther from the transmitter than the near receiver, and a processor. The transmitter may emit an electromagnetic signal of a first frequency into a geological formation, and the near receiver and far receiver may detect the electromagnetic signal. The processor may use contraction mapping to iteratively solve for a dielectric constant and a resistivity of the geological formation using a function of wavenumber having an attenuation of the electromagnetic signal between the near receiver and the far receiver and based on a phase shift of the electromagnetic signal between the near receiver and the far receiver as a complex constant.

In another example, one or more non-transitory machine-readable media include instructions to receive an attenuation measurement and a phase-shift measurement of a geological formation obtained by an electromagnetic downhole tool at a depth of the geological formation in a wellbore. The instructions also include instructions to, without computing any partial derivatives, use contraction mapping to iteratively solve for a dielectric constant and an electrical resistivity of the geological formation at the depth based on the attenuation measurement and the phase-shift measurement until the solution for dielectric constant converges and the solution for electrical resistivity converges.

Various refinements of the features noted above may be undertaken in relation to various aspects of the present disclosure. Further features may also be incorporated in these various aspects as well. These refinements and additional features may exist individually or in any combination.

For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
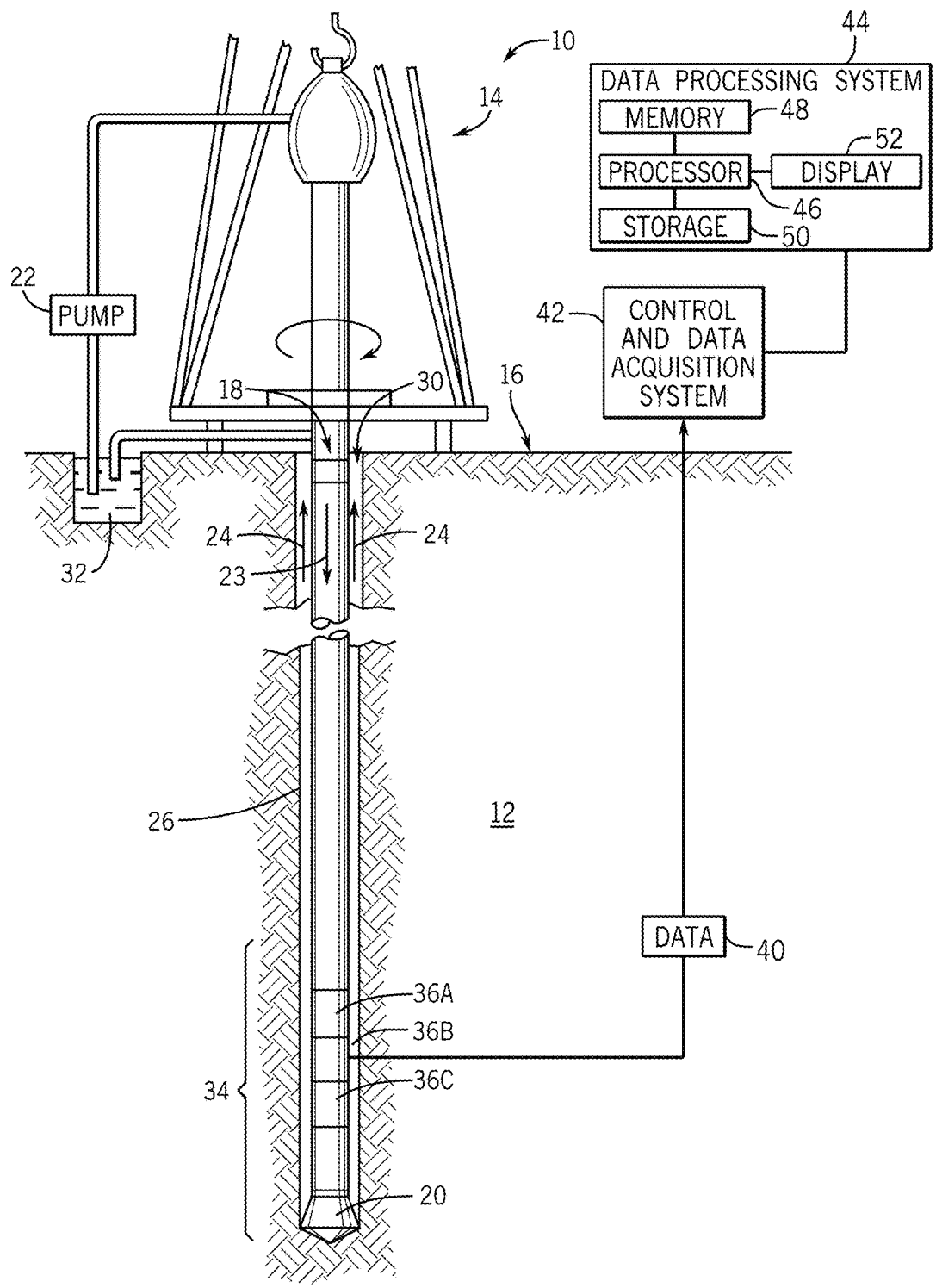
FIG. 1 is a schematic diagram of an example of a logging system that efficiently determines dielectric constant and electrical resistivity of a geological formation using contraction mapping, in accordance with an embodiment.

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As noted above, identifying the composition of a geological formation can provide information about the likely presence or absence of hydrocarbons in a subsurface geological formation. One way to identify the composition of a geological formation is through electromagnetic well logging. Electromagnetic well logging, as described in this disclosure, may involve measuring the way that radio propagation waves move through the geological formation. The attenuation and phase shift of the propagation radio waves through the geological formation are dependent on electromagnetic properties of the materials that compose the geological formation—namely, electrical resistivity and dielectric constant, among others. These electromagnetic values may correspond to the composition of the geological formation.

To accurately and efficiently determine the electrical resistivity and dielectric constant as taught by this disclosure, contraction mapping may be used to iteratively converge to a solution based on an electromagnetic model that is a function of wavenumber k of the measured electromagnetic propagation. This technique may reach convergence to a solution using fewer iterations than other techniques, even despite different initial guesses, different measurement conditions (e.g., frequencies and spacings), and different actual values of electrical resistivity and dielectric constant. As a result, the systems and methods of this disclosure may allow the determination of the composition of certain types of geological formations, such as shales, which might not otherwise be ascertainable, or which might otherwise be too time-consuming or resource-intensive depending on the initial guess of the values. Since the initial guess may itself be dependent on the subjective experience of the operator, reducing the dependence on the initial guess may make it more likely that a solution for electrical resistivity and dielectric constant may be identified.

With this in mind, FIG. 1 illustrates a drilling system 10 that may obtain electromagnetic data that can be used to obtain electrical resistivity and dielectric constant through contraction mapping. It should be appreciated that the drilling system 10 represents only one system that may employ the techniques of this disclosure. Indeed, any other conveyance may be used to obtain electromagnetic measurements that may be used to obtain the electrical resistivity and dielectric constant through contraction mapping. For example, the electromagnetic measurements that are used to obtain electrical resistivity and dielectric constant may be obtained from a logging-while-drilling tool (e.g., as shown in FIG. 1), a wireline tool, a coiled tubing tool, or any other suitable conveyance.

In the example of FIG. 1, the drilling system 10 may be used to drill a well into a geological formation 12 and obtain electromagnetic (e.g., phase shift and attenuation) logging measurements useful to identify characteristics of the well. A drilling rig 14 at the surface 16 may rotate a drill string 18 having a drill bit 20 at its lower end. As the drill bit 20 is rotated, a drilling fluid pump 22 is used to pump drilling fluid 23, which may be referred to as "mud" or "drilling mud," downward through the center of the drill string 18 in the direction of the arrow to the drill bit 20. The drilling fluid 23, which is used to cool and lubricate the drill bit 20, exits the drill string 18 through the drill bit 20. The drilling fluid 23 then carries drill cuttings away from the bottom of a wellbore 26 as it flows back to the surface 16, as shown by the arrows through an annulus 30 between the drill string 18 and the formation 12. However, as described above, as the drilling fluid 23 flows through the annulus 30 between the drill string 18 and the formation 12, the drilling mud 23 may begin to invade and mix with the fluids stored in the formation, which may be referred to as formation fluid (e.g., natural gas or oil). At the surface 16, return drilling fluid 24 is filtered and conveyed back to a mud pit 32 for reuse.

As illustrated in FIG. 1, the lower end of the drill string 18 includes a bottom-hole assembly (BHA) 34 that may include the drill bit 20 along with any suitable number of downhole tools. Here, three downhole tools 36A, 36B, and 36C are illustrated, but it should be appreciated that the BHA 34 may include more or fewer. The downhole tools 36A, 36B, and 36B may collect a variety of information relating to the geological formation 12 and/or the state of drilling of the well. For instance, one of the tools 36A may be a measurement-while-drilling (MWD) tool that may measure certain drilling parameters, such as the temperature, pressure, orientation of the drilling tool, and so forth. Likewise, another of the tools 36C may be a logging-while-drilling (LWD) tool that may measure the physical properties of the geological formation 12, such as density, porosity, resistivity, lithology, and so forth. In the example of FIG. 1, a downhole tool 36B is shown to be an electromagnetic tool that may obtain phase shift and attenuation measurements, from which electrical resistivity and dielectric constant may be ascertained.

The downhole tool 36B may be an LWD or MWD electromagnetic tool that collects at least the phase shift and attenuation measurements of the geological formation 12, among suitable other electromagnetic measurements. The measurements may be captured as data 40. The data 40 may be stored and processed in the BHA 34 and/or, as illustrated in FIG. 1, may be sent to the surface for processing. In the example of this disclosure, the data 40 may be sent via a control and data acquisition system 42 to a data processing system 44. The control and data acquisition system 42 may receive the data 40 in any suitable way. In one example, the control and data acquisition system 42 may transfer the data 40 via electrical signals pulsed through the geological formation 12 or via mud pulse telemetry using the drilling fluid 24. In another example, the data 40 may be retrieved directly from the downhole tool 36B upon return to the surface.

The data processing system 44 may include a processor 46, memory 48, storage 50, and/or a display 52. The data processing system 44 may use the data 40 to determine at least the electrical resistivity and dielectric constant. As will be discussed further below, the processing system 44 may use an electromagnetic model that defines the electromagnetic measurements as a function of the wavenumber k to determine the electrical resistivity and dielectric constant. The function of the wavenumber k may have properties that allow for the use of contraction mapping. A contraction mapping may have at most one fixed point, and iteratively solving for the fixed point thus may be possible regardless of initial guess. As such, the processing system 44 may ascertain the electrical resistivity and dielectric constant even if the operator of the processing system 44 chooses an initial guess that is substantially different from the actual values of electrical resistivity and dielectric constant. Thus, when the data processing system 44 processes the data 40, these formation properties may be determined when it might otherwise have been unfeasible as involving too many iterations and/or too much time using other techniques. Moreover, the data processing system 44 itself may process the data 40 without undue processing by avoiding the computation of partial derivatives. That is, as will be discussed below, at least one embodiment may expressly determine electrical resistivity and dielectric constant without computing any partial derivatives. As such, the processing system 44 may operate much more efficiently using the technique of this disclosure. Indeed, this disclosure may allow measurements to be obtained that might otherwise have been impossible using previous techniques.

To process the data 40, the processor 46 may execute instructions stored in the memory 48 and/or storage 50. As such, the memory 48 and/or the storage 50 of the data processing system 44 may be any suitable article of manufacture that can store the instructions. The memory 46 and/or the storage 50 may be ROM memory, random-access memory (RAM), flash memory, an optical storage medium, or a hard disk drive, to name a few examples. The display 52 may be any suitable electronic display that can display the logs and/or other information relating to properties of the well as measured by the downhole tool 36B. It should be appreciated that, although the data processing system 44 is shown by way of example as being located at the surface, the data processing system 44 may be located downhole in association with the downhole tool 36B. In such embodiments, some of the data 40 may be processed and stored downhole, while some of the data 40 may be sent to the surface in real time. This may be the case particularly in LWD, where a limited amount of the data 40 may be transmitted to the surface during drilling or reaming operations.

Figure 2:
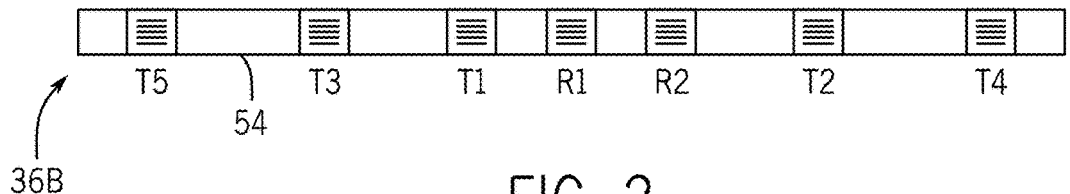
FIG. 2 is a schematic view of a downhole electromagnetic tool that may obtain an electromagnetic measurement useful to determine the dielectric constant and electrical resistivity of the geological formation, in accordance with an embodiment.

It should also be noted that, although the downhole tool 36B is described by way of example in a logging-while-drilling (LWD) configuration, any other suitable means of conveyance may be employed (e.g., wireline, slickline, coiled tubing, and so forth). One example of the downhole tool 36B appears in FIG. 2. The downhole tool 36B includes at least one transmitter coil (e.g., T1, T2, T3, T4, or T5) and at least two receiver coils (e.g., R1 and R2) in a housing 54.

Any suitable spacings may separate the transmitter coils T1, T2, T3, T4, and/or T5 from the receiver coils R1 and R2. In one example, at least one of the transmitter coils T1, T2, T3, T4, and/or T5 may be separated from a center of the two receiver coils R1 and R2 by about 16 inches. In another example, at least one of the transmitter coils T1, T2, T3, T4, and/or T5 may be separated from the center of the two receiver coils R1 and R2 by about 40 inches.

Figure 3:
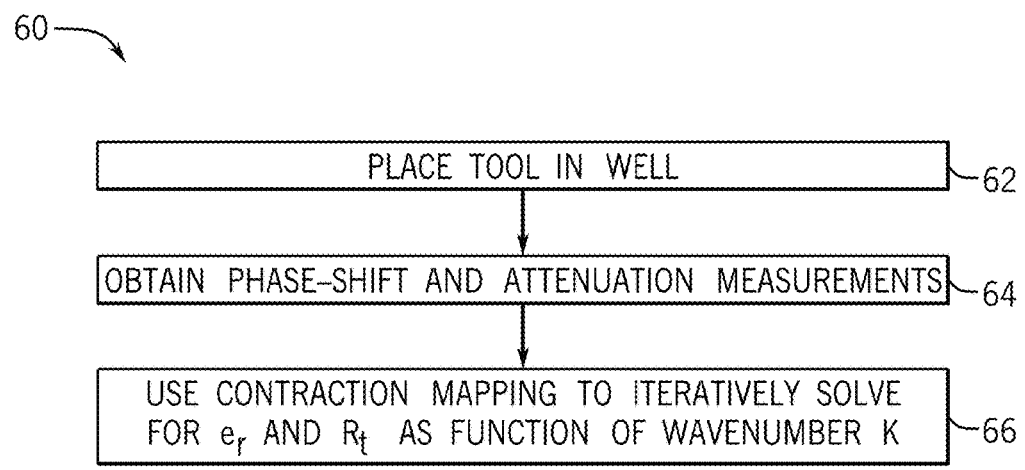
FIG. 3 is a flowchart of a method for determining the dielectric constant and electrical resistivity of the geological formation using contraction mapping, in accordance with an embodiment.

As shown by a flowchart 60 of FIG. 3, the downhole tool 36B may be placed into the wellbore 16 (block 62) and used to obtain electromagnetic phase-shift (PS) and attenuation measurements (AT) (block 64). As mentioned above, the downhole tool 36B may be placed into the wellbore 16 using any suitable conveyance (e.g., LWD, wireline, slickline, coiled tubing, and so forth). The electromagnetic phase-shift (PS) and attenuation (AT) measurements represent measurements associated with the propagation of electromagnetic waves emitted by at least one of the transmitter coils T1, T2, T3, T4, and/or T5 and detected by the two receiver coils R1 and R2. That is, at least one of the transmitter coils T1, T2, T3, T4, and/or T5 is used to emit a signal of a particular frequency (e.g., between a few kilohertz to a few MHz, such as 400 kHz or 2 MHz). The signal exits the transmitter coil and may pass through the geological formation 12 before being detected by the receiver coils R1 and R2. The signal detected at a first of the receiver coils (e.g., R1) may be different from the signal detected at a second of the receiver coils (R2). These differences depend on the electromagnetic characteristics (e.g., composition) of the geological formation 12.

Thus, the phase-shift (PS) and attenuation (AT) measurements of block 64 are obtained by comparing the difference detected signals obtained by the receiver coil R1 and the receiver coil R2 when one of the transmitter coils T1, T2, T3, T4, and/or T5 emits a signal. Specifically, the phase-shift (PS) measurement is obtained by measuring the extent to which the geological formation 12 causes the emitted signal to become shifted in phase as the signal travels through the geological formation 12 between the two receiver coils R1 and R2. The attenuation (AT) measurement measures the extent to which the emitted signal attenuates—that is, loses energy, and therefore has a lower amplitude—as the signal travels through the geological formation 12 from transmitter coil that sent the signal and the two receiver coils R1 and R2. These measurements may be used to ascertain related electromagnetic properties of the geological formation 12—namely, electrical resistivity and dielectric constant, among others. These electromagnetic values may correspond to the composition of the geological formation.

Rather than use an iterative inversion technique that involves computing partial derivatives of various electromagnetic properties—which may be more likely to fail to converge to a solution—contraction mapping may be used to iteratively converge to a solution of electrical resistivity and dielectric constant (block 66). The basis for using contraction mapping will now be described.

In particular, by approximating a measured part of the geological formation 12 to be a homogeneous, isotropic medium with electrical conductivity σ (reciprocal of electrical resistivity), dielectric constant ε, and magnetic permeability μ, angular frequency ω=2πf, the wavenumber k relating to the measured part of the geological formation 12 can be described as:

$$k = \sqrt{\omega\mu(\omega\varepsilon + i\sigma)} = \frac{\omega}{c}\sqrt{\mu_r}\sqrt{\varepsilon_r + i\frac{\sigma}{\omega\varepsilon_0}}, \quad (1)$$

where $c=\sqrt{\varepsilon_0\mu_0}$ is the speed of light in vacuum and $\varepsilon_r$ and $\mu_r$ are relative dielectric constant and magnetic permeability.

Approximating the downhole tool 36B as a magnetic point-dipole array leads to a simplified expression for phase-shift (PS) and attenuation (AT) measurements as a single complex-value quantity:

$$PS + iAT = 3i\ln\frac{r_{far}}{r_{near}} + k(r_{far} - r_{near}) + i\ln\left(\frac{1 - ikr_{near}}{1 - ikr_{far}}\right), \quad (2)$$

where $r_{far}$ represents a receiver R1 or R2 spacing that is farther from the transmitter T1, T2, T3, T4, or T5 that emits the signal and where $r_{near}$ represents a different receiver R1 or R2 spacing that is nearer to the transmitter T1, T2, T3, T4, or T5 that emits the signal.

The above relationship of Equation 2 is thus a non-linear function of the wavenumber k. Equation 2 may be rewritten as:

$$k = \frac{1}{r_{far} - r_{near}}\left(PS + iAT - 3i\ln\frac{r_{far}}{r_{near}} - i\ln\left(\frac{1 - ikr_{near}}{1 - ikr_{far}}\right)\right). \quad (3)$$

Equation 3 then has a form of x=ƒ(x). As such, contraction mapping may be used to determine a solution. A contraction mapping has at most one fixed point. For any x in the metric space of ƒ, the iterated function sequence x, ƒ(x), ƒ(ƒ(x)), ƒ(ƒ(ƒ(x))), . . . converges to the fixed point. According to the theory of contraction mapping, if the function ƒ is continuously differentiable in the metric space, and |ƒ' (x)|<1, the function sequence converges to the fixed point.

Figure 4:
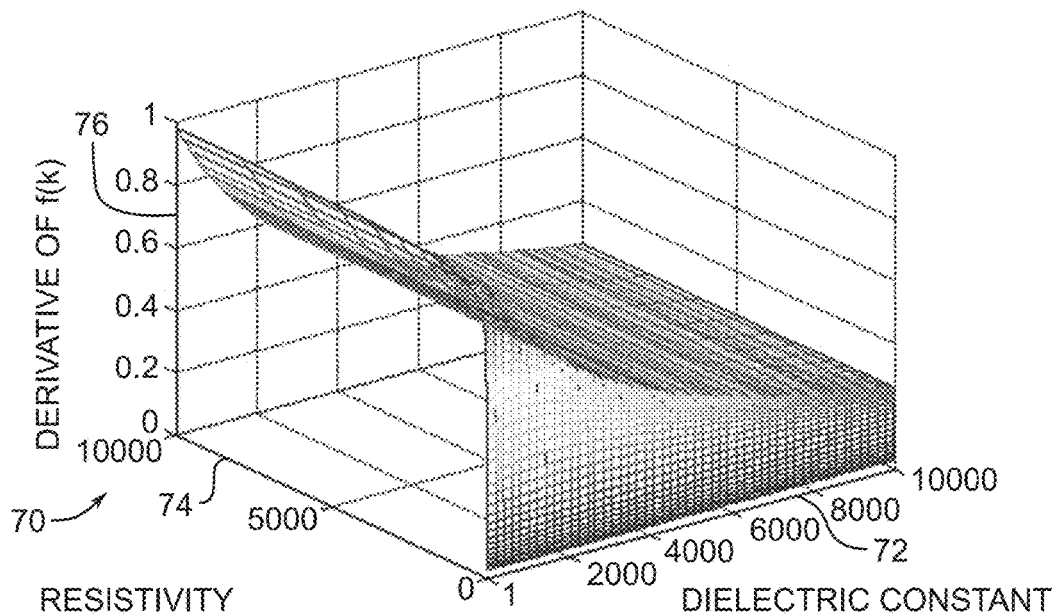
FIG. 4 is a plot of derivative of the mapping function for various actual values of dielectric constant and electrical resistivity and a function of wavenumber k to show that contraction mapping can be used to converge to a solution, in accordance with an embodiment.

Accordingly, contraction mapping may be used to determine electrical resistivity Rt (=1/σ) and dielectric constant $\varepsilon_r$ from phase-shift (PS) and attenuation (AT) measurements by solving for wavenumber k. From Equation 3, it may be found that $$|f'(k)| = \left|\frac{1}{(1 - ikr_{near})(1 - ikr_{far})}\right|,$$

which is plotted for the range of applicable resistivity Rt (=1/σ) and dielectric constant $\varepsilon_r$, in a plot 70 in FIG. 4. The plot 70 has a first axis 72 representing dielectric constant $\varepsilon_r$ from 1 to 10000, a second axis 74 representing electrical resistivity Rt from 0.1 to 10000 ohm·m, and a third axis 76 representing |ƒ'(k)|. The data plotted in FIG. 4 are obtained assuming that the signal frequency is f=2 MHz and that a transmitter coil is at 16" from a center of the first and second receivers R1 and R2. FIG. 4 shows that for this range of electrical resistivity Rt and dielectric constant $\varepsilon_r$, |ƒ' (k)|<1 are satisfied throughout the range. It is noted that |ƒ(k)| approaches one at relatively high resistivity and low dielectric constant, indicating that more iterations may occur to reach convergence. Nonetheless, it can be concluded that for the possible values of dielectric constant $\varepsilon_r$ and resistivity Rt in the range, contraction mapping can be used to solve for them by solving for wavenumber k.

Figure 5:
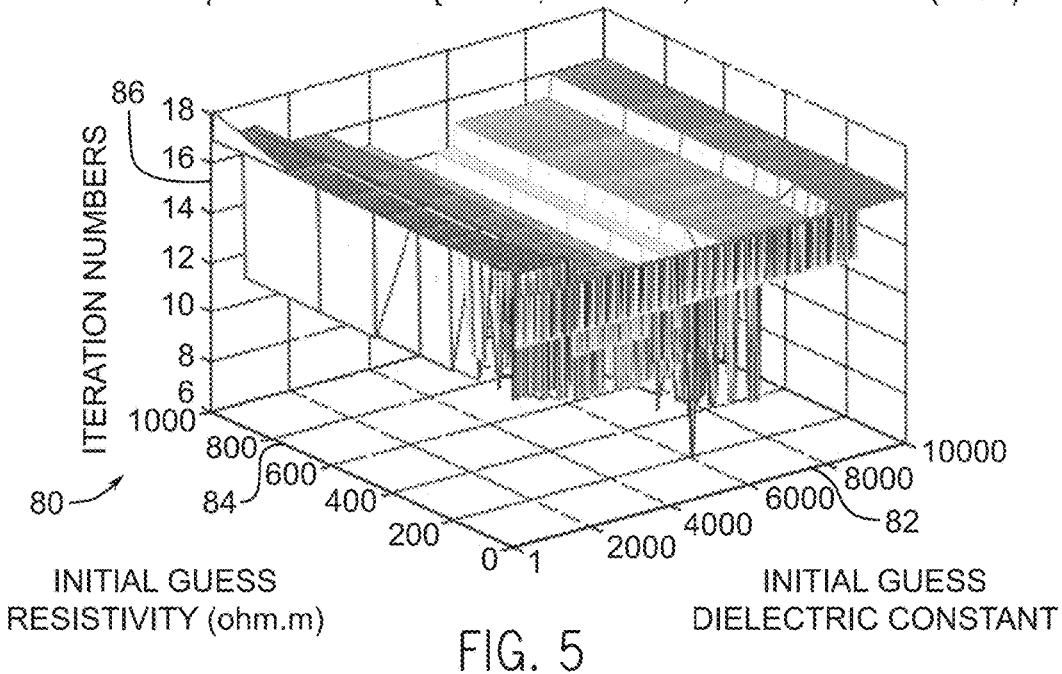
FIG. 5 is a plot showing convergence to a solution using contraction mapping despite great variation in initial guess values for a first set of conditions and one set of actual values, in accordance with an embodiment.

The number of iterations to converge to a solution using the contraction mapping approach of this disclosure may vary depending on the initial guess, but may remain relatively small. Indeed, this is shown in a plot 80 of FIG. 5, which illustrates total number of iterations for convergence based on Equation 3 above for an emitted signal of frequency f=2 MHz, an actual dielectric constant $\varepsilon_r$ of 5000 and a resistivity of 300 ohm·m, and a transmitter coil spacing of 16" from a center of the first and second receivers R1 and R2 (the two receivers are 6 inches apart). In the plot 80, a first axis 82 represents a range of initial guesses of dielectric constant $\varepsilon_r$ from 1 to 10,000, a second axis 84 represents a range of initial guesses of resistivity Rt from 0 to 1000 ohm·m, and a third axis 86 represents a total number of iterations taken for converging to a solution—here, the cases fall in a range of 6 to 18 iterations. Although the total number of iterations varies depending on the initial guess, no initial guesses shown in FIG. 5 would cause the total number of iterations to be too high for the data processing system 44 to quickly solve. Indeed, using contraction mapping based on Equation 3 under the conditions described by FIG. 5 could allow solving for dielectric constant $\varepsilon_r$ and resistivity Rt substantially in real time.

Figure 6:
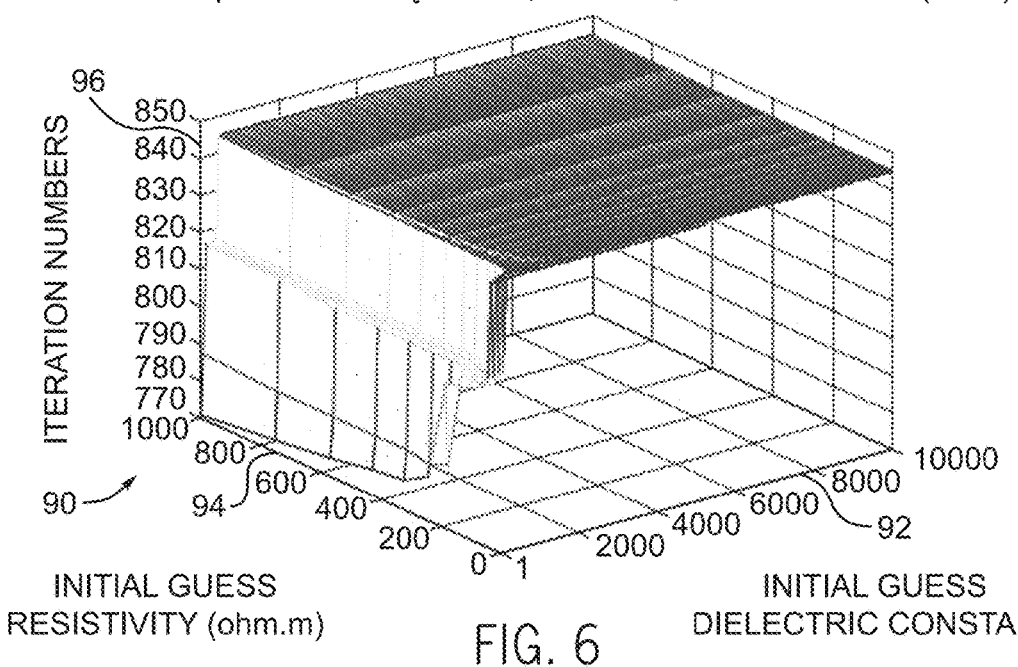
FIG. 6 is a plot showing convergence to a solution using contraction mapping despite great variation in initial guess values for a second set of conditions and one set of actual values, in accordance with an embodiment.

Even when the geological formation 12 has electromagnetic characteristics that are exceptionally higher or lower, still the total number of iterations for convergence may remain manageable. For example, a plot 90 of FIG. 6 illustrates total number of iterations for convergence based on Equation 3 above for an emitted signal of frequency f=2 MHz, an actual dielectric constant $\varepsilon_r$ of 10 and a resistivity of 5000 ohm·m, and a transmitter coil spacing of 16" from a center of the first and second receivers R1 and R2 (the two receivers are 6 inches apart). In the plot 90, a first axis 92 represents a range of initial guesses of dielectric constant $\varepsilon_r$ from 1 to 10,000, a second axis 94 represents a range of initial guesses of resistivity Rt from 0 to 1000 ohm·m, and a third axis 96 represents a total number of iterations taken for converging to a solution—here, the cases fall in a range of 770 to 850 iterations. Although the total number of iterations is higher under the circumstances of FIG. 6 than under the circumstances of FIG. 5, the total number of iterations remains acceptable from a practical point of view, even despite wildly different initial guesses. In this way, even though converging to a solution may take a large number of iterations, the data processing system 44 may continue to iterate even despite many iterations, because there is a solution that the data processing system 44 should converge to—in contrast to other techniques in which some initial guesses may simply lead to a lack of convergence to a solution, no matter how many iterations occur. As such, the contraction mapping technique of iteratively solving for wavenumber k may enable converging to a solution even when a solution might not converge using other techniques. Furthermore, even a relatively larger number of iterations (e.g., 850 iterations) may allow the data processing system 44 to solve for dielectric constant $\varepsilon_r$ and electrical resistivity Rt substantially in real time because of fast speed and low computational overhead of the new method.

Figure 7:
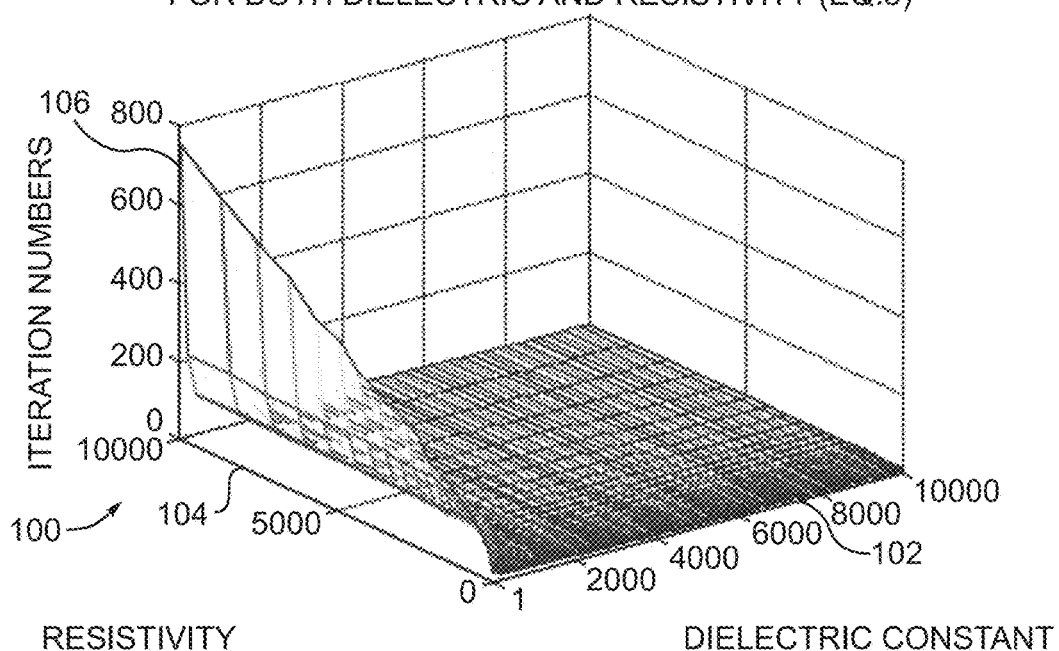
FIG. 7 is a plot showing convergence to a solution using contraction mapping despite great variation in actual values for the first set of conditions and an initial guess of 0.001 for dielectric constant and an initial guess of 0.001 ohm·m for electrical resistivity, in accordance with an embodiment.
Figure 8:
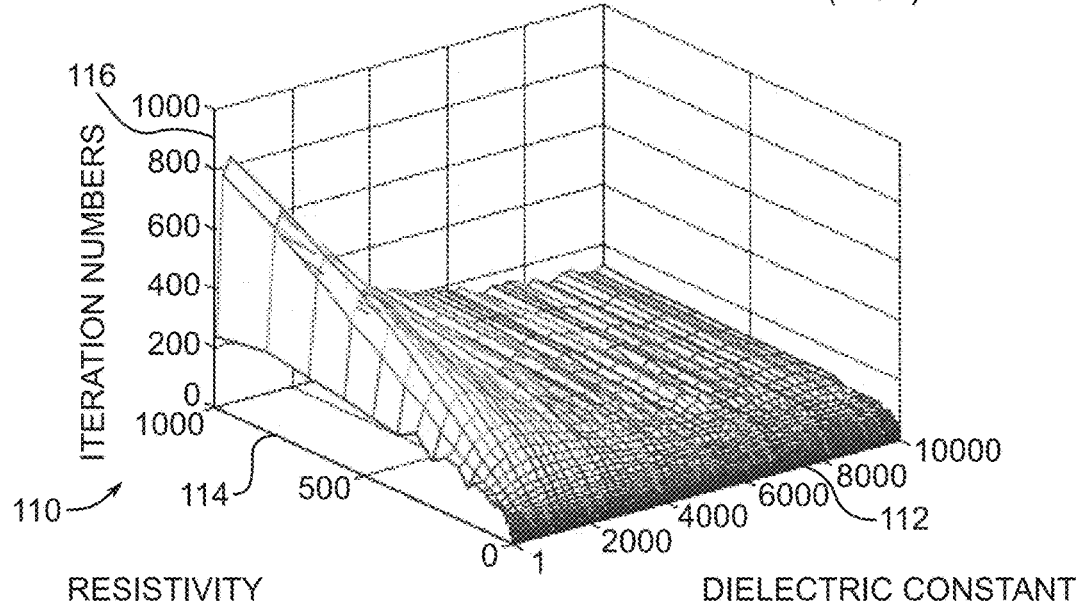
FIG. 8 is a plot showing convergence to a solution using contraction mapping despite great variation in actual values for the second set of conditions and an initial guess of 0.001 for dielectric constant and an initial guess of 0.001 ohm·m for electrical resistivity, in accordance with an embodiment.
Figure 9:
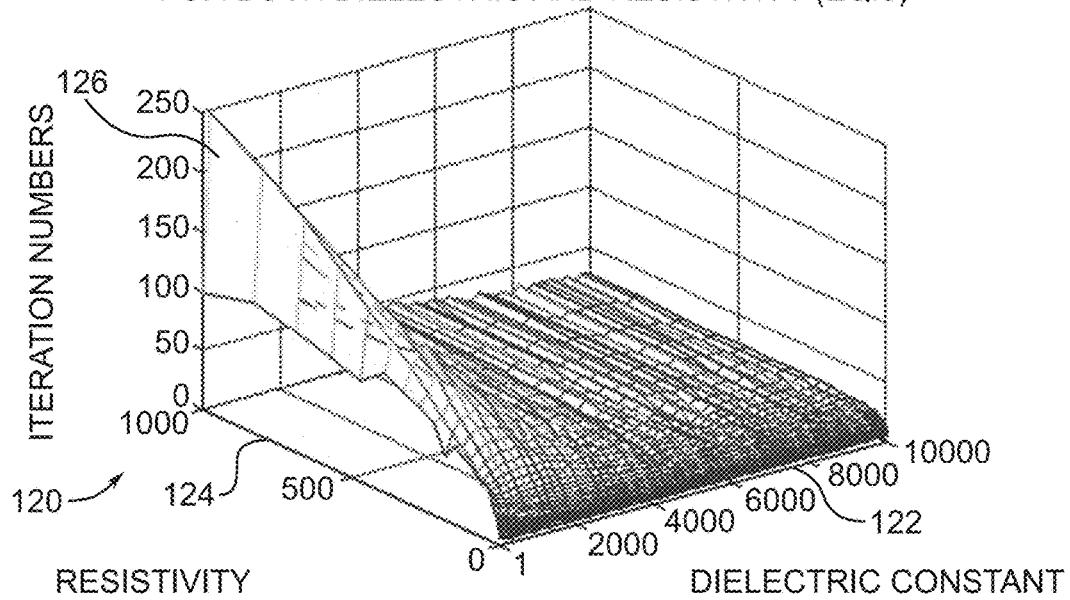
FIG. 9 is a plot showing convergence to a solution using contraction mapping despite great variation in actual values for a third set of conditions and an initial guess of 0.001 for dielectric constant and an initial guess of 0.001 ohm·m for electrical resistivity, in accordance with an embodiment.

FIGS. 7-9 provide additional examples of plots relating to the total number of iterations to converge to a solution using contraction mapping based on Equation 3. FIG. 7 illustrates a plot 100 showing total number of iterations for convergence based on Equation 3 for an emitted signal of frequency f=2 MHz, a transmitter coil spacing of 16" from a center of the first and second receivers R1 and R2 (the two receivers are 6 inches apart), and an initial guess of 0.001 for dielectric constant $\varepsilon_r$ and an initial guess of 0.001 ohm·m for electrical resistivity Rt. In the plot 100, a first axis 102 represents a range of actual values of dielectric constant $\varepsilon_r$ from 1 to 10,000, a second axis 104 represents a range of actual values of resistivity Rt from 0 to 10,000, and a third axis 106 represents a total number of iterations taken for converging to a solution—here, the cases fall in a range up to 850 iterations. The results shown in FIG. 7 are consistent with what have been observed in FIGS. 4 and 6, namely, the convergence of the new method is relatively slow in the region of high electrical resistivity and low dielectric constant, but the convergence still occurs and a solution is found.

The contraction mapping method based on Equation 3 is also applicable to other frequencies and spacings. For instance, FIG. 8 illustrates a plot 110 showing total number of iterations for convergence based on Equation 3 for an emitted signal of frequency f=400 kHz, a transmitter coil spacing of 16" from a center of the first and second receivers R1 and R2 (the two receivers are 6 inches apart), and an initial guess of 0.001 for dielectric constant $\varepsilon_r$ and an initial guess of 0.001 ohm·m for electrical resistivity Rt. In the plot 110, a first axis 112 represents a range of actual values of dielectric constant $\varepsilon_r$ from 1 to 10,000, a second axis 114 represents a range of actual values of resistivity Rt from 0 to 1000 ohm·m, and a third axis 116 represents a total number of iterations taken for converging to a solution—here, the cases fall in a range up to 1000 iterations. It may be seen that using a frequency of 400 kHz may entail more iterations, but convergence can still be reached.

FIG. 9 illustrates a plot 120 showing total number of iterations for convergence based on Equation 3 for an emitted signal of frequency f=400 kHz, a transmitter coil spacing of 40" from a center of the first and second receivers R1 and R2 (the two receivers are 6 inches apart), and an initial guess of 0.001 for dielectric constant $\varepsilon_r$ and an initial guess of 0.001 ohm·m for electrical resistivity Rt. In the plot 120, a first axis 122 represents a range of actual values of dielectric constant $\varepsilon_r$ from 1 to 10,000, a second axis 124 represents a range of actual values of resistivity Rt from 0 to 1000 ohm·m, and a third axis 116 represents a total number of iterations taken for converging to a solution—here, the cases fall in a range up to 250 iterations. Thus, it may be understood that a longer spacing may reduce the total number of iterations for convergence.

The expression used in the contraction mapping method to determine a solution for dielectric constant $\varepsilon_r$ and electrical resistivity Rt based on phase-shift (PS) and attenuation (AT) measurements may be any suitable expression for wavenumber k. Indeed, Equation 3 can be modified as follows:

$$k^2 = \frac{1}{\frac{1}{2}i(r_{near}^2 - r_{far}^2)}\left(PS + iAT - k(r_{far} - r_{near}) - 3i\ln\frac{r_{far}}{r_{near}} - i\ln\left(\frac{1 - ikr_{near}}{1 - ikr_{far}}\right) + \frac{1}{2}ik^2(r_{near}^2 - r_{far}^2)\right). \quad (4)$$

In Equation 4 above, a first order term has been subtracted, and a second order term has been added. These terms may help speed up the convergence in a high resistivity, low dielectric constant region, but may diverge in high dielectric, high resistivity regions. Indeed, this is shown in a plot 130 of FIG. 10. The plot 130 shows total number of iterations for convergence based on Equation 4 for an emitted signal of frequency f=2 MHz, a transmitter coil spacing of 16" from a center of the first and second receivers R1 and R2 (the two receivers are 6 inches apart), and an initial guess of 0.001 for dielectric constant $\varepsilon_r$ and an initial guess of 0.001 ohm·m for electrical resistivity Rt. In the plot 130, a first axis 132 represents a range of actual values of dielectric constant $\varepsilon_r$ from 1 to 10,000, a second axis 134 represents a range of actual values of resistivity Rt from 0 to 10,000 ohm·m, and a third axis 136 represents a total number of iterations taken for converging to a solution—here, all cases fall in a range up to 1500 iterations.

Figure 10:
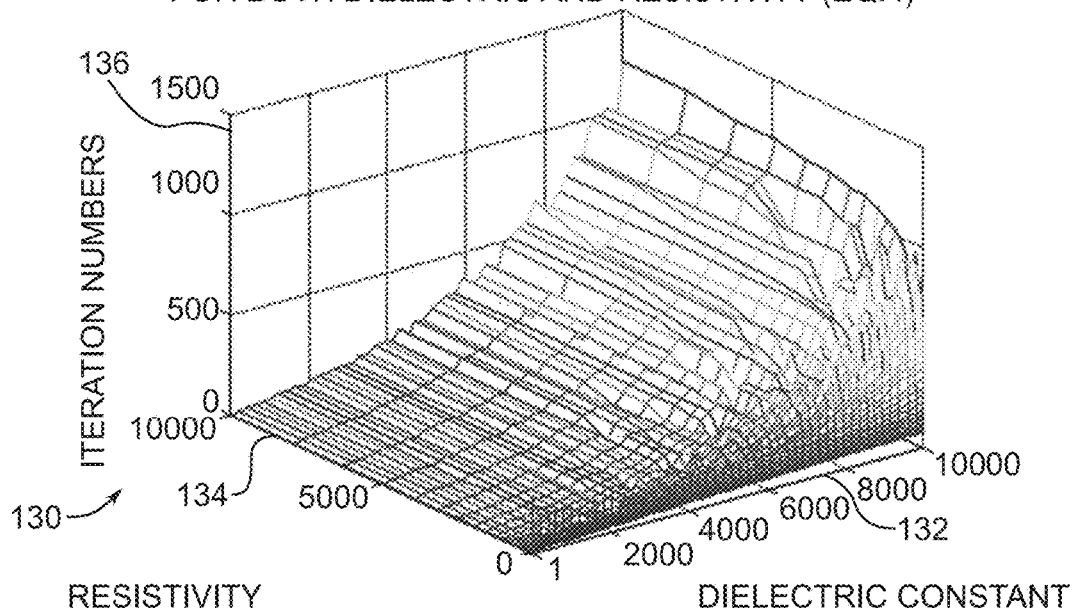
FIG. 10 is a plot showing convergence to a solution using contraction mapping despite great variation in actual values for the first set of conditions and an initial guess of 0.001 for dielectric constant and an initial guess of 0.001 ohm·m for electrical resistivity using another model, in accordance with an embodiment.
Figure 11:
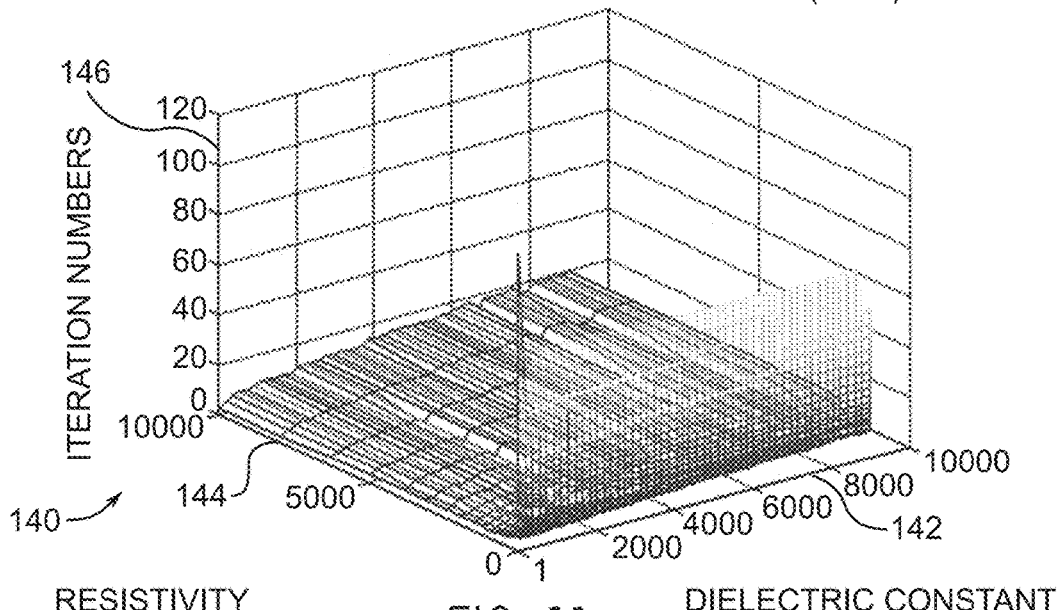
FIG. 11 is a plot showing convergence to a solution using contraction mapping despite great variation in actual values for the second set of conditions and an initial guess of 0.001 for dielectric constant and an initial guess of 0.001 ohm·m for electrical resistivity using the other model, in accordance with an embodiment.

While contraction mapping using Equation 4 can help speed up converge in the high resistivity, low dielectric constant region, as seen in FIG. 10, divergence rather than convergence may occur in a high dielectric, high resistivity region. But when the frequency is lowered to 400 kHz, contraction mapping using Equation 4 may achieve convergence much faster overall. Indeed, FIG. 11 illustrates a plot 140 showing total number of iterations for convergence based on Equation 4 for an emitted signal of frequency f=400 kHz, a transmitter coil spacing of 16" from a center of the first and second receivers R1 and R2 (the two receivers are 6 inches apart), and an initial guess of 0.001 for dielectric constant $\varepsilon_r$ and an initial guess of 0.001 ohm·m for electrical resistivity Rt. In the plot 140, a first axis 142 represents a range of actual values of dielectric constant $\varepsilon_r$ from 1 to 10,000, a second axis 144 represents a range of actual values of resistivity Rt from 0 to 10,000, and a third axis 146 represents a total number of iterations taken for converging to a solution—here, the cases fall in a range up to 120 iterations. Indeed, using Equation 4 with a frequency of f=400 kHz and transmitter coil spacing of 16" may result in fewer than 150 iterations to converge for any actual values of resistivity in ohm-meters and dielectric constant between 0 and 10,000.

Using Equation 3, Equation 4, or any other suitable equation that is a function of wavenumber k, the contraction mapping method may allow relatively quick convergence to a solution for dielectric constant $\varepsilon_r$ and resistivity Rt. Indeed, convergence may occur relatively quickly despite a wide variation in actual values, initial guesses, and other circumstances such as spacing and signal frequency. The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure. Moreover, means-plus-function or step-plus-function construction is not intended unless a claim expressly recites "means for" or "step for" followed by a function. Recitations such as "configured to" are intended to define the operation of claim elements without invoking means-plus-function or step-plus-function construction.

The invention claimed is:

1. A method comprising:
   placing a downhole tool in a wellbore in a geological formation;
   using the downhole tool to emit a signal from a transmitter into the geological formation and receive the signal by a near receiver and a far receiver to obtain an electromagnetic attenuation measurement and an electromagnetic phase shift measurement; and
   with a processor, solving for dielectric constant or electrical resistivity, or both, via contraction mapping to iteratively solve for wavenumber using:
      distances of the near and far receivers to the transmitter; and
      a function of wavenumber having attenuation and phase shift as a complex constant.

2. The method of claim 1, wherein using the downhole tool to obtain the electromagnetic attenuation measurement and the electromagnetic phase shift measurement comprises detecting the signal from the near receiver a first distance from the transmitter and detecting the signal from the far receiver a second distance from the transmitter, wherein the first distance is less than the second distance.

3. The method of claim 2, wherein the function of wavenumber accords with the following relationships:

$$k = \frac{1}{r_{far} - r_{near}}\left(PS + iAT - 3i\ln\frac{r_{far}}{r_{near}} - i\ln\left(\frac{1 - ikr_{near}}{1 - ikr_{far}}\right)\right); \text{ and}$$

$$k = \sqrt{\omega\mu(\omega\varepsilon + i\sigma)} = \frac{\omega}{c}\sqrt{\mu_r}\sqrt{\varepsilon_r + i\frac{\sigma}{\omega\varepsilon_0}};$$

wherein k represents wavenumber, PS represents the phase shift, AT represents the attenuation, $r_{far}$ represents a relative position of the far receiver, $r_{near}$ represents a relative position of the near receiver, $c=\sqrt{\varepsilon_0\mu_0}$ is the speed of light in vacuum, $\varepsilon_r$ and $\mu_r$ are relative dielectric constant and magnetic permeability, $\sigma$ represents electric conductivity, $\omega=2\pi f$ is the angular frequency, and f is a frequency of the signal emitted by the transmitter.

4. The method of claim 2, wherein the function of wavenumber accords with the following relationships:

$$k^2 = \frac{1}{\frac{1}{2}i(r_{near}^2 - r_{far}^2)}\left(PS + iAT - k(r_{far} - r_{near}) - 3i\ln\frac{r_{far}}{r_{near}} - i\ln\left(\frac{1 - ikr_{near}}{1 - ikr_{far}}\right) + \frac{1}{2}ik^2(r_{near}^2 - r_{far}^2)\right); \text{ and}$$

$$k = \sqrt{\omega\mu(\omega\varepsilon + i\sigma)} = \frac{\omega}{c}\sqrt{\mu_r}\sqrt{\varepsilon_r + i\frac{\sigma}{\omega\varepsilon_0}};$$

wherein k represents wavenumber, PS represents the phase shift, AT represents the attenuation, $r_{far}$ represents a relative position of the far receiver, $r_{near}$ represents a relative position of the near receiver, $c=\sqrt{\varepsilon_0\mu_0}$ is the speed of light in vacuum, $\varepsilon_r$ and $\mu_r$ are relative dielectric constant and magnetic permeability, $\sigma$ represents electric conductivity, $\omega=2\pi f$ is the angular frequency, and f is a frequency of the signal emitted by the transmitter.

5. The method of claim 3, wherein the frequency of the signal that is emitted by the transmitter is between 50 kHz and 5 MHz.

6. The method of claim 3, wherein a spacing between the transmitter and a midpoint between the near receiver and the far receiver is between 16 inches and 40 inches.

7. The method of claim 4, wherein the frequency of the signal that is emitted by the first transmitter is between 50 kHz and 5 MHz.

8. The method of claim 4, wherein a spacing between the transmitter and a midpoint between the near receiver and the far receiver is between 16 inches and 40 inches.

9. The method of claim 1, wherein iteratively solving for wavenumber comprises starting with an initial guess of dielectric constant as a component of wavenumber, wherein the initial guess for the dielectric constant is a value between 0 and 10,000.

10. The method of claim 1, wherein iteratively solving for wavenumber comprises starting with an initial guess of electrical resistivity as a component of wavenumber, wherein the initial guess for the electrical resistivity in units of ohm-meters is a value between 0 and 1000.

11. A system comprising:
    a transmitter configured to emit an electromagnetic signal of a first frequency into a geological formation;
    a near receiver configured to receive the electromagnetic signal;
    a far receiver configured to receive the electromagnetic signal, wherein the far receiver is spaced farther from the transmitter than the near receiver; and
    a processor configured to use contraction mapping to iteratively solve for a dielectric constant and an electrical resistivity of the geological formation using a function of wavenumber having an attenuation of the electromagnetic signal between the near receiver and the far receiver and based on a phase shift of the electromagnetic signal between the near receiver and the far receiver as a complex constant.

12. The system of claim 11, wherein the function of wavenumber comprises a first-order term $k(r_{far}-r_{near})$ but not a second-order term $\frac{1}{2}ik^2(r_{near}^2-r_{far}^2)$; wherein k represents wavenumber, $r_{far}$ represents a relative position of the far receiver, and $r_{near}$ represents a relative position of the near receiver.

13. The system of claim 11, wherein the function of wavenumber comprises a second-order term $\frac{1}{2}ik^2(r_{near}^2-r_{far}^2)$ but not a first-order term $k(r_{far}-r_{near})$; wherein k represents wavenumber, $r_{far}$ represents a relative position of the far receiver, and $r_{near}$ represents a relative position of the near receiver.

14. The system of claim 11, wherein the processor is configured to use a different one of a plurality of functions of wavenumber depending on expected values of electrical resistivity and dielectric constant.

15. The system of claim 14, wherein the processor is configured to use a first of the plurality of functions of wavenumber in a relatively higher resistivity and lower dielectric constant region and to use a second of the plurality of functions of wavenumber in a relatively lower resistivity and higher dielectric constant region.

16. The system of claim 15, wherein the first of the plurality of functions of wavenumber accords with the following relationship:

$$k = \frac{1}{r_{far}-r_{near}}\left(PS + iAT - 3i\ln\left(\frac{1-ikr_{near}}{1-ikr_{far}}\right)\right);$$

wherein k represents wavenumber, PS represents the phase shift, AT represents the attenuation, $r_{far}$ represents a relative position of the far receiver, $r_{near}$ represents a relative position of the near receiver;

wherein the second of the plurality of functions of wavenumber accords with the following relationship:

$$k^2 = \frac{1}{\frac{1}{2}i(r_{near}^2-r_{far}^2)}\Bigg(PS + iAT - k(r_{far}-r_{near}) -$$

-continued $$3i\ln\frac{r_{far}}{r_{near}} - i\ln\left(\frac{1-ikr_{near}}{1-ikr_{far}}\right) + \frac{1}{2}ik^2(r_{near}^2-r_{far}^2)\Bigg);$$

wherein k represents wavenumber, PS represents the phase shift, AT represents the attenuation, $r_{far}$ represents the relative position of the far receiver, $r_{near}$ represents the relative position of the near receiver; and
    wherein a definition of the wavenumber k accords with the following relationship:

$$k = \sqrt{\omega\mu(\omega\varepsilon + i\sigma)} = \frac{\omega}{c}\sqrt{\mu_r}\sqrt{\varepsilon_r + i\frac{\sigma}{\omega\varepsilon_0}};$$

$c=\sqrt{\varepsilon_0\mu_0}$ is the speed of light in vacuum, $\varepsilon_r$ and $\mu_r$ are relative dielectric constant and magnetic permeability, $\sigma$ represents electric conductivity, $\omega=2\pi f$ is the angular frequency, and f is the first frequency.

17. One or more non-transitory machine-readable media comprising instructions to:
    receive an attenuation measurement and a phase-shift measurement of a geological formation obtained by an electromagnetic downhole tool at a depth of the geological formation in a wellbore, wherein the electromagnetic downhole tool comprises a transmitter for emitting a signal into the geological formation and first and second receivers for receiving the signal; and
    without computing any partial derivatives, use contraction mapping to iteratively solve for a dielectric constant and a resistivity of the geological formation at the depth based on distances of the first and second receivers to the transmitter and the attenuation measurement and the phase-shift measurement until the solution for dielectric constant converges and the solution for resistivity converges.

18. The one or more non-transitory machine-readable media of claim 17, wherein the instructions to use contraction mapping comprise instructions to use contraction mapping with a function of wavenumber k having a complex constant PS+iAT, wherein AT represents attenuation and PS represents phase shift.

19. The one or more non-transitory machine-readable media of claim 18, wherein the instructions to use contraction mapping to iteratively solve for the dielectric constant and the resistivity are configured to cause convergence to solutions with fewer than 150 iterations.

20. The one or more non-transitory machine-readable media of claim 18, wherein the instructions to use contraction mapping to iteratively solve for the dielectric constant and the resistivity are configured to cause convergence regardless of initial guesses between 0.001 and 1000 for either resistivity in units of ohm-meter or dielectric constant.

* * * * *